A. R. DODGE.
METERING LOW VELOCITY FLUID FLOWS.
APPLICATION FILED NOV. 9, 1912.

1,108,721.

Patented Aug. 25, 1914.
2 SHEETS—SHEET 2.

Witnesses:
Marcus L. Byng
J. Ellis Glenn

Inventor:
Austin R. Dodge,
by Albert G. Davis
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

METERING LOW-VELOCITY FLUID-FLOWS.

1,108,721.  Specification of Letters Patent.  Patented Aug. 25, 1914.

Application filed November 9, 1912. Serial No. 730,351.

*To all whom it may concern:*

Be it known that I, AUSTIN R. DODGE, a citizen of the United States, residing at Schenectady, in the county of Schenectady, State of New York, have invented certain new and useful Improvements in Metering Low-Velocity Fluid-Flows, of which the following is a specification.

This invention relates to apparatus for determining the varying quantities of fluid flowing through a conduit during equal increments of time, and its object is to ascertain accurately what the flow is, even when the velocity is low. In that type of flow meter in which the indications are produced by a pressure-difference device in the fluid conduit, there is liability of error when the flow is small, because the velocity is low and the pressure-difference slight, so that variations are not so readily discernible. My invention aims to remove this objection by providing a branch conduit of considerably smaller cross-section than the main conduit, so that a small and definite proportion of the fluid will pass through it. A pressure-difference nozzle or the like is located in the branch conduit, and the main conduit is provided with a shut-off valve which is closed by automatically acting means when the fluid flow and velocity drop to a predetermined minimum. The closing of the main conduit compels all the fluid to flow through the branch conduit, and inasmuch as this is of smaller area, the velocity will be correspondingly increased and the indication correspondingly improved.

For a consideration of what I believe to be novel and my invention, attention is directed to the accompanying description and claims appended thereto.

Figure 1:
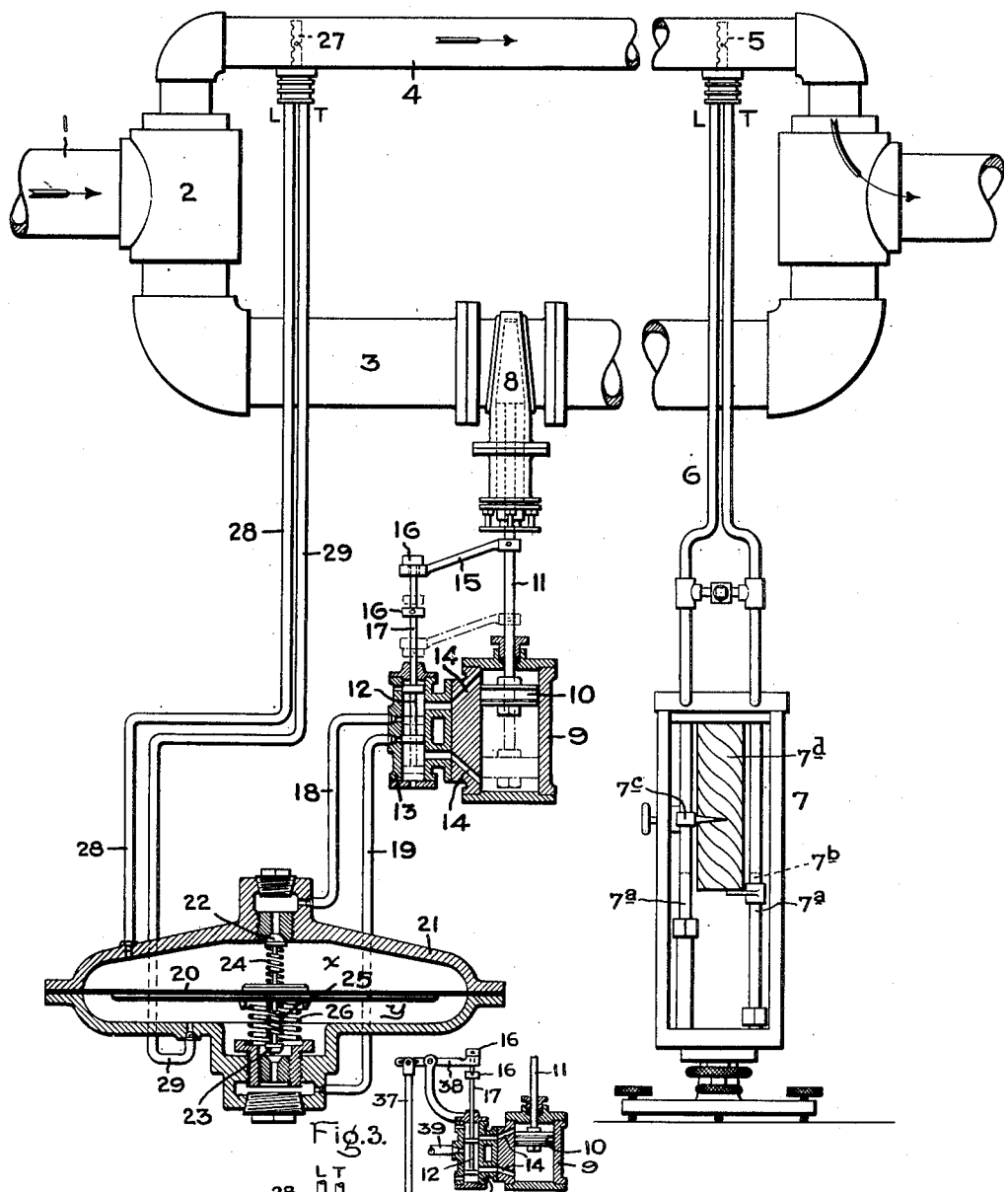
Figure 2:
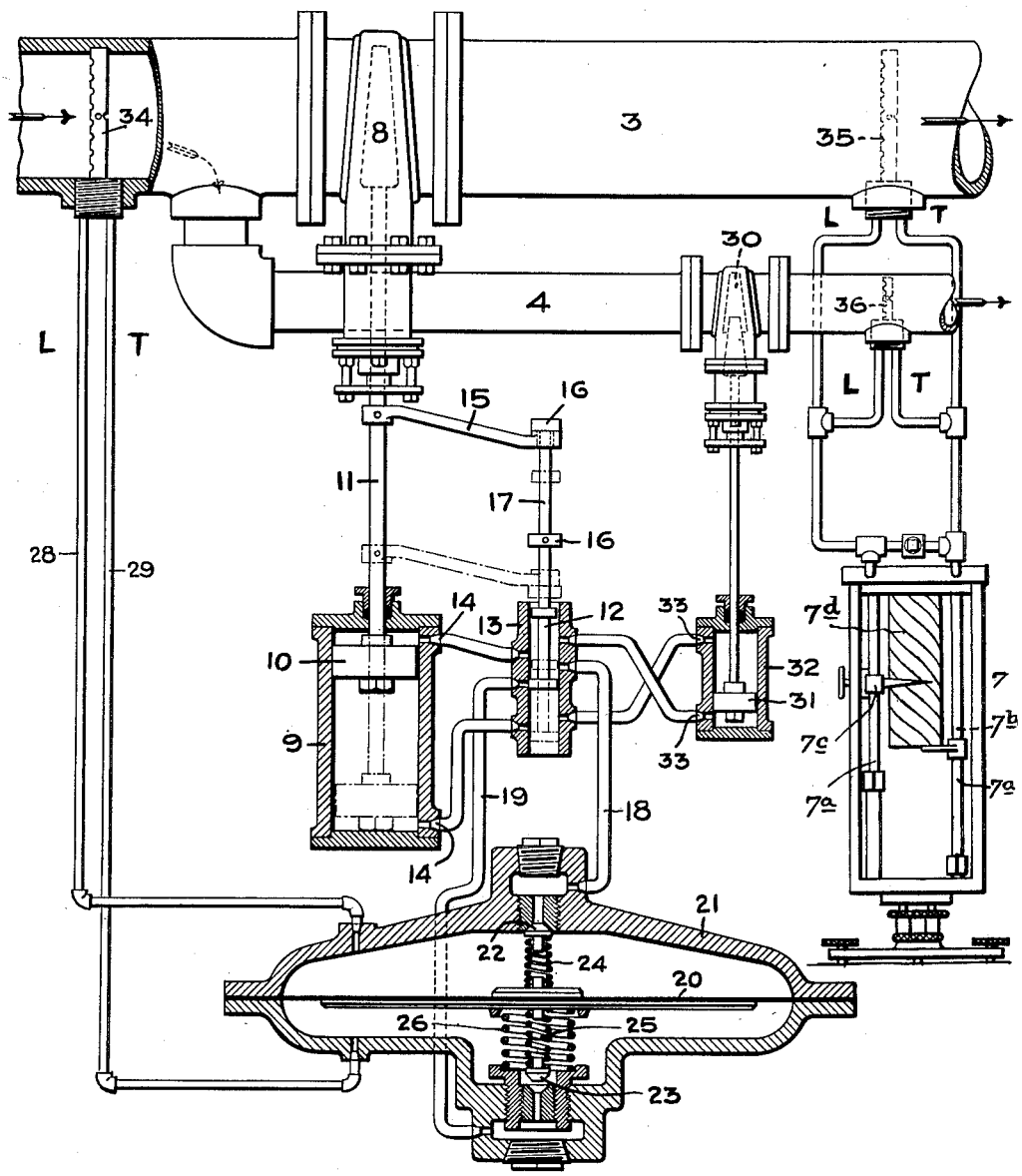

In the accompanying drawing, Figure 1 is a diagrammatic representation of one embodiment of my invention; Fig. 2 is a similar view of a modification, and Fig. 3 is a diagrammatic view of a modified form of a valve-motor controlling mechanism.

Referring to Fig. 1, the conduit 1 divides at 2 into a large or main branch 3 and a small or shunt branch 4. The fluid arriving at the point 2 will divide between the two branches in exact proportion to their areas. A nozzle 5 for creating a pressure-difference responsive to changes in the rate of flow of the fluid being metered is inserted in the shunt branch 4, and its leading and trailing sides are connected by pipes 6 with a flow meter 7 of any desired construction. The meter shown in the drawing is the one covered by my Patent No. 1,087,929, granted February 24, 1914. This meter is of the indicating type although it could as well be of any other type if desired. It comprises a pair of transparent sight tubes $7^a$ containing a U-shaped column of mercury $7^b$, a sliding pointer $7^c$ extending over a drum $7^d$ having a suitable scale thereon, shown by the curved lines, plotted in suitable terms as for example pounds per hour for steam, cubic feet per minute for air, or gallons per minute for liquids. In service the pointer is adjusted vertically to register with the upper-end of the left hand leg of the mercury column and the indication of the meter is read by comparing the pointed end of the pointer with the curved lines on the drum. So long as the two branch conduits 3 and 4 are open, the meter will function as usual, the velocity of the fluid being the same in both branches, and the meter being calibrated for a conduit the size of both combined.

In the main branch 3 is a shut-off valve, preferably a sliding gate valve 8. Means are provided for closing this valve by power, such as the motor shown, comprising a cylinder 9, and a piston 10 therein whose piston rod 11 is attached directly to the valve. The stroke of the piston is equal to a complete opening of the valve in one direction and a complete closure thereof in the other. It is not intended that the valve shall occupy intermediate positions. The movement of the piston is controlled by a regulator such as a pilot valve 12, preferably of the piston type, working in a valve chest 13 and controlling ports 14 leading to the ends of the cylinder. The valve is actuated by a tappet arm 15 on the piston rod 11 which strikes collar 16 on the valve stem 17 about midway of its stroke. Motive fluid is supplied to the valve chest through two pipes 18, 19, which open into said chest at such points that when the valve 12 is shifted by the tappet arm, one of its piston heads covers the end of the pipe through which the motive fluid has been entering and cuts off the flow; at the same time uncovering the other pipe so that a reverse movement of the motor can be effected by admitting the motive fluid through said other pipe. It will be observed that the distance between the collars 16 is considerably greater than the thickness of the tappet arm. In other words there is lost motion between the arm and collars. This is important because the gate valve 8 must not be opened and closed for minor variations in flow of the fluid being metered but only when a substantial and predetermined change takes place. The collars are adjustable on the valve spindle so that the proper action of the valve can be effected.

The supply of fluid pressure to the motor is controlled by a means responsive to variations in the rate of flow of the fluid being metered and consisting of a flexible diaphragm 20 inclosed in a casing 21, which divides into upper and lower chambers $x$ and $y$. The pipe 18 connects with the chamber $x$ and the pipe 19 with the chamber $y$. Valves 22, 23, suitably attached to the diaphragm respectively control the pipes 18, 19; the arrangement being such that when one is open the other will be closed. Springs 24, 25 urge the valves toward their seats. A strong spring 26 in the chamber $y$ will close the upper valve 22 if the pressure in the chamber $x$ drops to a predetermined minimum.

A pressure-difference nozzle 27 responsive to variations in the rate of flow of the fluid being metered is inserted in the branch conduit 4, having its leading side connected by pipe 28 with the chamber $x$ and its trailing side connected by pipe 29 with the chamber $y$.

The operation is as follows: Assuming a considerable flow of fluid in the conduit, the pressure in the chamber $x$ will cause the diaphragm to open the valve 22 and admit fluid to the valve chest through the pipes 28 and 18, from which it flows to the upper end of the cylinder 9 and forces down the piston 10 to open the gate valve 8 in the main branch 3. The parts will remain in this position until the flow drops to a point where the pressure in chamber $x$ is overbalanced by the spring 26, which at once forces up the diaphragm, closes the valve 22, and opens the valve 23. This admits pressure from the pipe 29, chamber $y$ and pipe 19 to the motor, and the parts finally assume the position shown in Fig. 1, with the valve 23 open, the pilot valve 12 raised, the piston at the upper end of the cylinder, and the gate valve closed. All the fluid must now flow through the small branch conduit 4, and though its quantity may be small, yet the reduced area through which it must pass raises its velocity to a point where the meter 7 can accurately indicate comparatively small variations.

It will be understood of course, that if the meter is calibrated or set for flow through a conduit having a cross-sectional area equal to the combined cross-sectional areas of the conduits 3 and 4, that when the conduit 3 is closed and the flow is through the conduit 4 only, suitable corrections of the readings or adjustment of the instrument will be made to obtain the flow under these conditions.

In the modification shown in Fig. 2 there is a gate valve 30 in the branch main 4, operated by a piston 31 in a cylinder 32, whose ports 33 are connected with the valve chest at points substantially opposite the openings which lead to the ports 14 of the motor 9. The passages to the ports 33, however, are crossed, so that the motors operate in opposite directions, the valve 30 opening when the valve 8 closes. The result of this arrangement is that during normal conditions, all the fluid passes through the main conduit, and none through the branch conduit, the latter coming into use only when the fluid flow drops to such a point that its velocity in the main conduit is too low to influence the meter properly. The nozzle plug 34 for the regulator is placed in the main conduit in advance of the junction therewith of the branch conduit. The meter is connected with two nozzle plugs 35, 36, one in the main and the other in the branch conduit so that the meter will always be in service irrespective of which conduit is in service. This meter is here shown as being of the same construction as the one shown in Fig. 1 and the same reference characters have been applied to corresponding parts.

In Fig. 3 is shown a modified form of governing mechanism for the valve actuating motor which possesses the advantage of simplicity and reliability in operation. 20 indicates the diaphragm contained in a casing 21. The chamber $x$ in the upper side of the diaphragm is connected by the pipe 28 to the leading side of nozzle 27 and the chamber $y$ to the trailing side of said nozzle as before. Under the diaphragm is a coiled compression spring 26. Attached to the diaphragm is a rod 37 that passes through a suitable stuffing box in the casing and is attached to the tappet lever 38 which is pivotally supported on a bracket carried by the valve actuating motor. The motor comprises a cylinder 9 and a piston 10, the latter being connected to a shut-off valve in one of the mains. The motor is controlled by a pilot valve 12 which is actuated by the tappet lever 38 in response to movements of the diaphragm, there being lost-motion between said lever and the stops 16 on the valve stem as before and for the same purpose. The fluid under pressure for actuating the piston is supplied by the pipe 39 leading from the main to be metered.

A fluid meter of the character described is exceedingly sensitive to variations in the rate of flow of the fluid being metered but only a relatively small amount of power is available. It is on this account that the nozzle 27 is provided so that the movements of the valve can be accomplished without imposing any load whatsoever on the meter and hence without interfering with the accuracy of the meter indications. The valve 8 may be arranged to close under any predetermined condition by properly adjusting the parts. As an example it may be made to close when the rate of flow has been reduced to one-quarter or one-third the normal flow. These figures are merely given as an illustration and not as a limitation of my invention since special cases may require special adjustments.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. Means for accurately measuring the flow of fluid comprising parallel flow conduits of different cross-sectional areas, a meter, means for creating a pressure difference responsive to changes in the rate of flow of the fluid passing through said conduits and constantly subjecting said meter to the effects thereof, a valve for shutting off one of the conduits when the rate of flow of fluid falls below a predetermined value, and means responsive to changes in the rate of flow of the fluid being metered and independent of the meter for actuating said valve.

2. Means for accurately measuring the flow of fluid comprising a large and a small conduit arranged for parallel flow, a meter, means responsive to changes in the rate of flow of the fluid in the small conduit for causing the meter to act, a valve for putting the large conduit into and out of service, means for actuating the valve, and means in the small conduit and acting independently of the meter to control said valve actuating means.

3. Means for accurately measuring small flows of fluid, consisting of a large conduit and a small branch conduit, a flow meter, a nozzle plug in the small conduit connected to the meter, a valve in the large conduit, a motor for actuating said valve, a pressure-difference device in the stream of fluid to be metered, and a differential pressure regulator connected with said device and controlling said motor.

4. Means for accurately measuring small flows of fluid, consisting of a large conduit and a small branch conduit, a flow meter having a nozzle plug in the small conduit, a valve in the large conduit, a motor for actuating said valve, a pressure-difference device in the fluid stream, a casing having a diaphragm forming two chambers communicating with said pressure-difference device, and valves controlled by said diaphragm for admitting fluid pressure from said chambers to said motor.

5. The combination of parallel flow conduits of different cross-sections, a flow meter, a device responsive to changes in the rate of fluid flow located in the smaller conduit and conveying fluid under pressure to the meter, a valve for shutting off one of said conduits, a motor for actuating said valve, a member that is moved in response to variations in the rate of flow of the fluid being metered, and a means actuated by said member controlling the motor.

6. The combination of parallel flow conduits of different cross-sections, a flow meter, a device responsive to changes in the rate of fluid flow located in the smaller conduit and conveying fluid under pressure to the meter, a valve which has an open and a closed position for shutting off one of said conduits, a fluid motor for actuating said valve, a pilot valve for the motor, a movable member sensitive to pressure variations for moving the pilot valve, a device for creating a pressure difference that varies in response to variations in the rate of flow of the fluid being metered, and conduits for conveying said pressure difference to opposite sides of said member.

7. In combination, a pair of conduits, one of which is smaller than the other, a meter sensitive to changes in the rate of flow of fluid passing through the smaller conduit, said meter being calibrated for a conduit equal in cross-sectional area to both of said conduits, a valve in the larger conduit, a motor for actuating said valve, a regulator for the motor, and means sensitive to variations in the rate of flow of the fluid being metered which acts on the regulator through lost-motion to prevent minor changes in flow from affecting the position of the valve.

8. Means for accurately measuring the flow of fluid comprising a plurality of flow conduits connected in parallel as regards the flow of fluid, a meter, means for creating a pressure difference responsive to changes in the rate of flow of fluid passing through said conduits and constantly subjecting said meter to the effects thereof, a valve for shutting off one of the conduits when the rate of flow of fluid falls below a predetermined value, and means responsive to changes in the rate of flow of the fluid being metered and independent of the meter for actuating said valve.

In witness whereof, I have hereunto set my hand this 8th day of November 1912.

AUSTIN R. DODGE.

Witnesses:
BENJAMIN B. HULL,
HELEN ORFORD.